United States Patent [19]

Yan

[11] 4,402,821
[45] Sep. 6, 1983

[54] PROCESS FOR LIQUEFACTION OF COAL
[75] Inventor: Tsoung-Yuan Yan, Philadelphia, Pa.
[73] Assignee: Mobil Oil Corporation, New York, N.Y.
[21] Appl. No.: 321,135
[22] Filed: Nov. 13, 1981
[51] Int. Cl.³ .......................... C10G 1/00; C10G 1/06
[52] U.S. Cl. .................................... 208/8 LE; 208/10
[58] Field of Search ............................... 208/8 LE, 10
[56] References Cited
U.S. PATENT DOCUMENTS

| | | | |
|---|---|---|---|
| 3,852,182 | 12/1974 | Sze et al. | 208/8 LE |
| 3,856,675 | 12/1974 | Sze et al. | 280/8 LE |
| 4,019,975 | 4/1977 | Urquhart | 280/10 |
| 4,090,957 | 5/1978 | Leonard | 208/8 LE X |
| 4,201,660 | 5/1980 | Zosel | 208/86 |
| 4,251,345 | 2/1981 | Ogura et al. | 208/8 LE |
| 4,251,346 | 2/1981 | Dry et al. | 423/445 X |

FOREIGN PATENT DOCUMENTS 2803916  8/1979  Fed. Rep. of Germany ........ 208/10

Primary Examiner—Delbert E. Gantz
Assistant Examiner—William G. Wright
Attorney, Agent, or Firm—Alexander J. McKillop; Michael G. Gilman; Howard M. Flournoy

[57] ABSTRACT

A coal liquefaction process comprises a liquefaction stage and an extraction stage. In the liquefaction stage the comminuted coal is liquefied with a process-derived solvent under elevated temperature and pressure conditions. In the extraction stage the liquefied coal is extracted with an extraction solvent, which can be derived from the process or initially supplied from external sources, comprising aromatic hydrocarbons having boiling point of up to 400° F., to extract valuable hydrocarbon products from the liquefied coal and to separate the extract phase from ash and undissolved coal under elevated temperature and pressure conditions. The extraction is conducted at supercritical temperature and pressure conditions for the extraction solvent. The temperature and pressure of the extract phase is then decreased, thereby decreasing the dissolution power of the solvent and separating the extract phase into a deashed fraction and a liquid fraction. A portion of the liquid fraction is recycled back to the extractor as the extraction solvent and the remainder of the liquid fraction is subjected to further pressure reduction and is passed to an atmospheric distillation column or stripper. The stripper bottom is a high quality coal extract (solid at ambient temperature and pressure conditions), and the overhead stream is recycled to the extractor as the extract solvent. A portion of the high quality coal extract is recycled to the liquefaction zone as the liquefaction solvent and the remainder thereof is removed from the process as the major product thereof.

7 Claims, 1 Drawing Figure

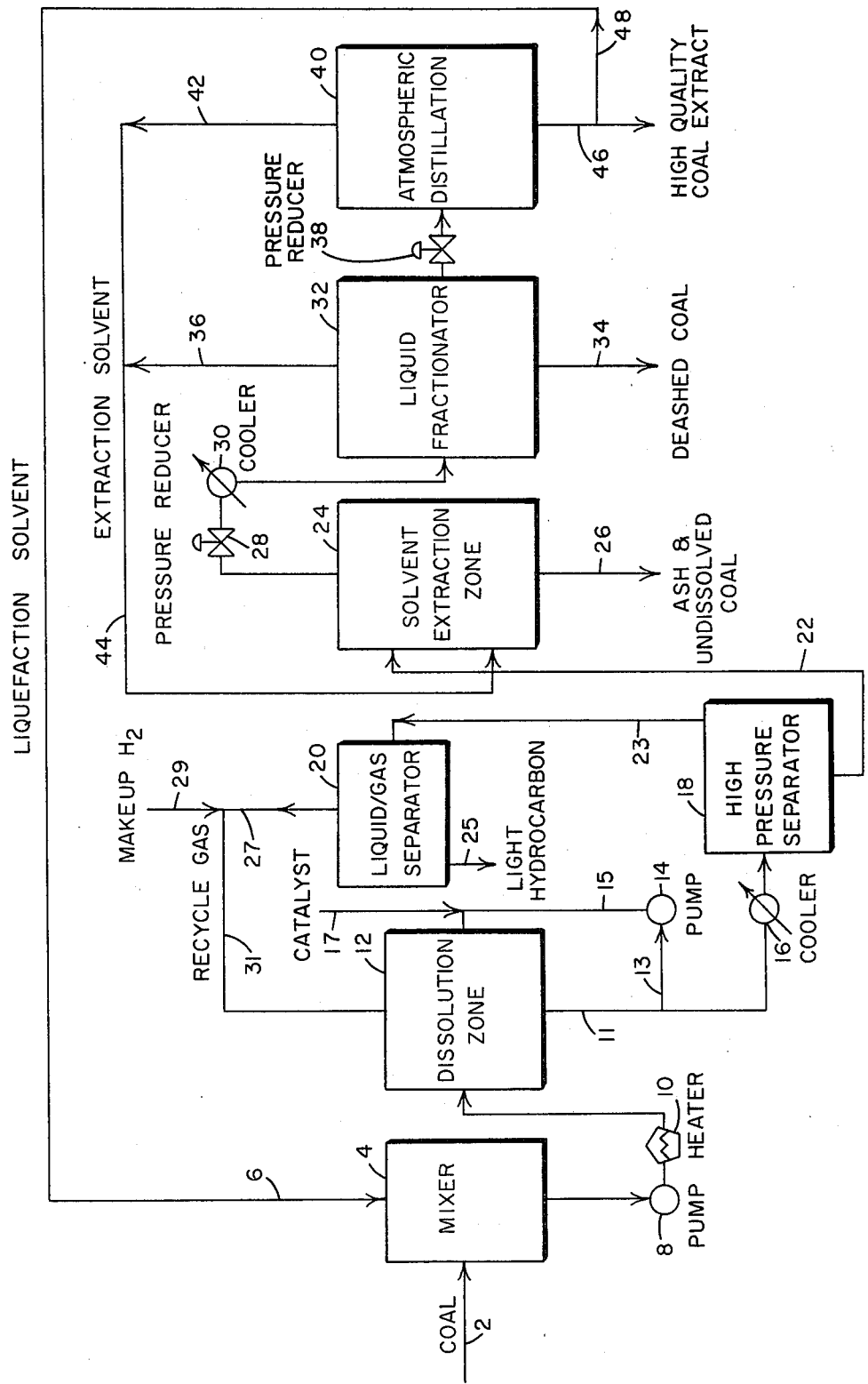

PROCESS FOR LIQUEFACTION OF COAL

BACKGROUND OF THE INVENTION

1. Field of the Invention

This invention relates to a process for liquefying coal. More particularly, this invention relates to an improved liquefaction process.

2. Description of Related Art

While the references are believed to afford a greater understanding of the invention described herein, they are not believed to be "prior art" in the sense they teach or suggest such invention.

It is well known in the art that coal can be converted to valuable liquid products by subjecting it to liquefaction in the presence of a suitable liquefaction solvent. The liquefaction may be conducted optionally in the presence of hydrogen and/or with a suitable catalyst.

The product of liquefaction usually comprises a mixtue of liquefied coal extract and undissolved coal residue, including undissolved extractable carbonaceous matter and mineral matter or ash. The undissolved extractable carbonaceous matter and the finely divided mineral matter remaining in the product of the liquefaction step must be separated from the valuable liquefied carbon products before liquefied carbon products are further processed or utilized commercially. The fine minute particle size of the undissolved coal and mineral matter present in the liquefaction product causes severe difficulties in attempting to use conventional solid-liquid separation techniques to remove these solid particles from the liquefied coal.

Thus attempts to use filtration techniques have not been particularly successful, because of plugging of the filter parts with or without a precoat and the expense involved in providing the requisite large filtration area. Similarly, gravity settling techniques also have not been successful, because of relatively low settling rates and inefficient ash removal. Centrifugation techniques have also not met with a great deal of commercial success, because of relatively high cost and the difficulty in separating the lighter finely divided materials.

Attempts have been made in prior art to separate the finely divided ash and undissolved coal particles by chemical means, i.e., by contacting the liquefied coal with a so called promoter liquid which is said to facilitate subsequent gravity settling of the finely divided ash and undissolved coal particles, e.g., as described in U.S. Pat. Nos. 3,852,182 and 3,856,675. However, the use of the promoter liquid described in the aforementioned prior art also has a number of disadvantages, because the process-using the promoter liquid, which is a fraction boiling between 425° and 500° F., also uses a liquefaction solvent comprising a hydrocarbon fraction boiling between 600° and 900° F., which, after liquefaction, is subjected to a conventional distillation separation technique, whereby the promoter liquid and the liquefaction solvent fractions are recovered for subsequent use in the process. During the distillation step, however, the presence of the high-boiling fraction (i.e., of the 600° to 900° F. liquefaction solvent fraction) makes the distillation step susceptible to the production of coke and/or coal which clog up the process equipment and decrease the yield of liquid products. Thus, the liquefaction step must be conducted at increasingly more severe temperature and pressure conditions to produce increased proportions of light liquid products, which are used as the promoter liquid. The use of increasingly more severe temperature and pressure conditions in the liquefaction step, however, results in increased hydrogen consumption and production of large amounts of gas and coke, at the expense of desirable liquid.

Other methods of interest are disclosed in three articles printed in the June 1979 CEP. They are "Antisolvent Deashing" by M. Peluso et al., page 41, "Critical Solvent Deashing of Liquefied Coal" by R. M. Adams et al., page 44 and "Supercritical Extraction of Coal," by R. R. Maddocks et al., page 49.

BRIEF DESCRIPTION OF THE DRAWING

The drawing is a schematic representation of a liquefaction and deashing process of the present invention.

SUMMARY OF THE INVENTION

The invention provides an improved process comprising the steps of liquefying coal material in a liquefaction stage under liquefaction conditions in the presence of a process-derived liquefaction solvent, passing the liquefied coal to an extraction stage, wherein dissolved coal and heavy coal constituents rich in hydrogen are extracted with an extraction solvent, and ash and undissolved coal constituents are removed from the process, the improvement which comprises (1) recovery of coal liquid by means of extraction with solvent at supercritical temperature and pressure for that solvent, (2) separation of the coal liquid from the extract phase by decreasing temperature and pressure of the system without subjecting it to vacuum distillation and recovery of the said coal liquid as the overhead product and (3) fractionation of the coal liquid into solvent refined coal and high quality coal liquids useful as turbine fuel, diesel fuel, or for further upgrading to premium liquid product. With respect to step (2), the pressure is about 100 psig and the temperature is about 10° F. below critical conditions of the solvent.

DETAILED DESCRIPTION OF THE INVENTION

Following is a general description of the process of this invention.

In the liquefaction stage, comminuted coal is contacted in a mixer with a process derived liquefaction solvent. The liquefaction solvent is generated in the process of this invention and it is a high quality coal extract which is substantially soluble in light aromatics having boiling points of below 400° F. at atmospheric pressure. The liquefaction solvent is substantially solid at ambient conditions of temperature and pressure and it is soluble in the light aromatic solvents at elevated temperatures. The solvents derived in this manner, which are normally missing from the liquefaction solvent derived from conventional distillation means, contain heavy ends of the coal liquid and are unexpectedly found to be particularly effective solvents for coal liquefaction. The liquefaction solvents are further characterized in that they have a high aromatic and nitrogen content and low ash.

The coal-liquefaction solvent slurry is then heated and passed to a dissolution means wherein the coal is substantially liquefied. The dissolution means is equipped with a liquid recycle loop, which may optionally contain a means for introducing a liquefaction catalyst into the dissolution means. The effluent of the dissolution means is cooled and then passed to a high pressure separator which separates light liquid hydrocarbons from the liquefied stream of dissolved coal, ash and undissolved coal particles. The light liquid hydrocarbons are passed to a liquid/gas separator which separates light liquid hydrocarbons from a gas stream. The gas stream is recycled, optionally with hydrogen added thereto, to the dissolution means.

The liquefied stream of dissolved coal, ash and undissolved coal particles is then passed to a solvent extraction stage. This is not the solvent used for coal liquefaction. In the solvent extraction stage, the liquid stream is contacted, at high temperature and pressure conditions, with a substantially aromatic extraction solvent to separate ash and undissolved coal from the liquefied coal and to dissolve valuable heavy organic coal constituents rich in hydrogen into the extraction solvent. The extraction solvent can be derived from the instant process and comprises light aromatics, such as, for example, benzene, alkylated derivatives of benzene (such as toluene and ortho-, meta- or para-xylenes), naphthalenes, phenols or any other light aromatic constituents boiling between 150° and 400° F. at atmospheric pressure conditions, or any mixture of the aforementioned constituents obtained from external sources. Accordingly, the phrase "aromatic hydrocarbon or a mixture of aromatic hydrocarbons" is used herein to designate any one of the hydrocarbons set forth above or any desired mixture of the aforementioned hydrocarbons.

The temperature and pressure in the solvent extract phase are then reduced and the solvent extract phase is conducted to a liquid fractionation means, thereby separating deashed coal from the liquid fraction having some organic coal constituents dissolved therein. A portion of the liquid fraction is recycled as the extraction solvent. Pressure in the remainder of the liquid fraction is further reduced and the low pressure liquid fraction is passed into a distillation column or stripper operating at substantially atmospheric conditions. From the stripper, there is recovered an overhead stream, recycled as the extraction solvent, and a bottoms stream, a portion of which is used as a high quality coal extract product such as turbine fuel, diesel fuel, and the like and the remainder of which is recycled into the process as the liquefaction solvent.

In the liquefaction stage or liquefaction means, a pulverized comminuted coal is admixed with a liquefaction solvent in a mixer. Preferred coals used in this process are bituminous coal, and other caking coals which melt easily and have carbon contents exceeding about 70%, preferably having carbon contents of about 80 to about 85%.

Following is a more detailed description of the process with particular reference to the drawing.

The liquefaction solvent is introduced into the mixer at 300° F. to 700° F., preferably 400° F. to 600° F., and a pressure of 0 psig to 4,000 psig, preferably 50 psig to 3,000 psig. The amount of the liquefaction solvent added to the mixer is such that the weight ratio of the pulverized coal to the liquefaction solvent in the mixer is about 0.1 to 5, preferably 0.5 to 2.

The slurry comprised of the liquefaction solvent and the coal, produced in the mixer, is then pumped to a heating means, wherein its temperature is increased to at least 500° F., preferably 500° to 900° F. and most preferably 700° to 850° F. The pressure of the slurry at this point is at least 50 pounds per square inch gauge (psig), preferably 50 to 3000 psig, and most preferably 200 to 2500 psig. The heated pressurized slurry is then conducted to a dissolution zone, wherein it is held for ½ to 60 minutes, preferably 5 to 50 minutes, and most preferably 10 to 45 minutes. The heating means and the dissolution zone can be any suitable apparatus well known in the art, for effecting the heating of the slurry and the dissolution thereof, respectively, under the conditions of temperature and pressure and residence time as set forth above. The dissolution means can optionally be equipped with a recycle loop for recycling the slurry of the coal in the liquefaction solvent to improve the rate of coal dissolution in the liquefaction solvent. In addition, the recycle loop can optionally be equipped with a means for introducing catalysts into the dissolution means to increase the rate of dissolution of coal in the liquefaction solvent. Suitable catalysts are cobalt molybdate, iron oxide, so called red mud or iron oxide obtained as a by-product in aluminum production, and other well known coal liquefaction catalysts.

The effluent from the dissolution means is passed into a gas recovery loop which includes a cooler, a high pressure separator, a gas liquid separator, and a conduit for recycling gas from the gas liquid separator to the dissolution means. The effluent from the cooler is passed into the high pressure separator, operating at a temperature of 550° F. to 800° F., preferably 600° F. to 700° F., and a pressure of 0 psig to 4,000 psig, preferably 50 psig to 3,000 psig. The high pressure separator separates the liquefied stream of dissolved coal, ash and undissolved coal particles from light liquid hydrocarbons, having a boiling point below 200° F. to 300° F. Thus, the bottom effluent of the high pressure separator comprises a solution of the dissolved coal ash and undissolved coal particles in the liquefaction solvent, while the top effluent thereof comprises the light hydrocarbons and gases produced in the process. The top effluent stream of the high pressure separator is passed to a liquid-gas separator means, operating at the temperature of 300° F. to 600° F. and pressure of 50 psig to 3,000 psig. The gas-liquid separator emits gaseous products as the overhead stream and light liquid hydrocarbon products as the bottom stream thereof. The gaseous products are recycled back into the dissolution means. Optionally, a stream of make-up hydrogen (0.1 to 1% by volume) can be added to the recycle gas to increase the rate of coal dissolution in the liquefaction solvent.

The bottom effluent of the high pressure separator is then conducted to the extraction stage of the process. Thus, the bottom effluent containing approximately 10–20% by volume of ash and undissolved coal is conducted to the solvent extractor or means operating at the temperature of 500° to 800° F., preferably 550° F. to 750° F. and most preferably 600° F. to 700° F., and a pressure of 500 to 3000 psig, preferably 600 to 2800 psig, most preferably 650 to 2500 psig. In the solvent extractor means, the high pressure separator bottom effluent is contacted with an extraction solvent. Preferably, the extraction solvent is conducted into the solvent extraction means at supercritical conditions of temperature and pressure because such supercritical temperature and pressure conditions facilitate dissolution of heavy organic coal substituents rich in hydrogen and dissolution thereof into the extraction solvent. However, it is not absolutely necessary, for the successful operation of this process, to contact the high pressure separator bottoms with the extraction solvent at supercritical conditions. This is because the dissolution of hydrogen rich coal constituents into the solvent can also be accomplished at the temperature and pressure conditions at or below critical. Nonetheless, for superior performance, supercritical conditions are preferred.

The residence time of the extraction solvent and the bottom effluent from the high pressure separator in the solvent extraction zone is 1 minute to 100 minutes, preferably 10 to 60 minutes. Generally, however, the residence time in the solvent extraction means is that necessary for substantially complete separation of ash ad undissolved coal from the bottom effluent of high pressure separator. The term "substantially complete separation of ash and undissolved coal" is used herein to designate the separation of at least 90%, preferably at least 98%, of all of the ash and undissolved coal material present in the bottom effluent of the high pressure separator. Accordingly, the exact residence time in the solvent extraction means can be easily ascertained by those skilled in the art to accomplish the aforementioned degree of separation of ash and undissolved coal from the hydrogen rich organic coal constituents in the solvent extraction means. The bottom effluent from the solvent extraction means comprises substantially all of the ash and undissolved coal material present in the liquefied coal and the top effluent from the solvent extraction means (the extract phase) is a stream of the extraction solvent rich in heavy coal constituents containing a large proportion of hydrogen. The ash and undissolved coal material rejected from the bottom of the solvent extraction means is used as a boiler fuel or to generate hydrogen in well known prior art processes.

The extract phase is then passed through a pressure reducing means and a cooling means wherein its pressure is reduced to about 0 to 1000 psig, preferably 200 to 900 psig, and most preferably 250 to 800 psig, and temperature to about 250° to 600° F., preferably 300° to 550° F., and most preferably 300° to 500° F. With the reduction in the temperature and pressure conditions of the extract phase, the dissolution power of the extraction solvent decreases to a point at which hydrogen poor, coal liquid is no longer soluble therein. Accordingly, hydrogen poor, coal liquid settles at the bottom of the liquid fractionating means and is removed from the process for further processing or for commercial applications, such as solvent refined coal for use as boiler fuel.

The liquid fractionating means comprises any well known apparatus which can effectively separate hydrogen poor, coal liquid from a liquid and gas fraction recovered in the top of the liquid fractionating means.

The residence time of the extract phase in the liquid fractionating means is sufficient to separate substantially all of the deashed coal (at least 90% and preferably 98% or more from the extract phase. Thus, suitable residence time can be easily selected by those skilled in the art to effect the desired result. However, the usual residence time is at least about 1 minute, is preferably about 30 minutes, and is most preferably about 20 minutes.

The top stream recovered from the liquid fractionating means comprises the extraction solvent and hydrogen rich coal liquid. Optionally, a portion of the top effluent from the liquid fractionating means is recycled back into the solvent extraction means. The remaining portion of the top effluent is subjected to further pressure reduction by means 17 to a substantially ambient pressure and it is subsequently conducted to an atmospheric distillation column or stripper, whereby a high quality coal liquid is separated at the bottom of the stripper from the extraction solvent at the top of the stripper. The stripper is operated at 200° F. to 600° F., preferably 300° F. to 550° F., most preferably at 400° F. to 500° F. and at 0 psig to 100 psig, preferably 5 psig to 50 psig, and most preferably 10 psig to 30 psig. The bottom product of the stripper is a high quality coal extract which is soluble in the light aromatics solvents used as the extraction solvent. A portion of this high quality coal extract is recycled into the mixer as the liquefaction solvent. The high quality coal liquid produced in excess of the liquefaction solvent requirement is the major product of the process which can be marketed as coal liquid, as turbine or boiler fuels or upgraded further to premium liquid products in a manner well known to those skilled in the art. The overhead light product for the stripper is recycled to the extraction means.

Referring now to the drawing, which illustrates one of the embodiments of the pesent invention, a stream of comminuted coal, e.g., bituminuous coal, is introduced into the mixer 4 through a conduit 2. A stream of liquefaction solvent, is also introduced simultaneously into the mixer 4 through a conduit 6. A slurry of the coal in the liquefaction solvent formed in the mixer is pumped by a pump 8 to a heater 10 wherein the temperature of the slurry is increased to at least 600° F. The heated slurry is introduced into the dissolution zone 12, operating at 600° f. to 900° F. and 50 to 3000 psig, wherein the dissolution of substantially all of the coal products (at least 70% of the coal constituents amenable to dissolution) from the coal into the liquefaction solvent takes place. The dissolution zone is equipped with a recycle loop comprising a conduit 13, a pump 14, a conduit 15 and a catalyst conduit 17. A portion of the coal dissolved in the liquefaction solvent is diverted from a conduit 11 via the conduit 13 and pumped by a pump 14 back into the dissolution zone through the conduit 15. A liquefaction catalyst, such as cobalt molybdate or iron sulfide can optionally be introduced through the conduit 17 into this recycle loop to increase the rate of the coal dissolution in the liquefaction solvent.

The dissolved coal is conducted from the dissolution zone through a cooler 16, e.g., a shell and tube heat exchanger, wherein its temperature is decreased to about 750° F. The partially cooled, liquefied coal is then conducted to a high pressure separator 18, which separates light hydrocarbons and gases, removed through a top conduit 23, from the residue which comprises ash, high molecular weight coal extract and uncoverted coal removed as the bottoms product of the separator through a conduit 22. The top overhead stream is conducted to a liquid gas separator 20, operated at 300° F. and 40 to 2900 psig, to separate light liquid hydrocarbons, e.g., removed through a conduit 25, from gases removed overhead through a conduit 27/ The gases are then recycled back into the dissolution zone through a conduit 31, which may optionally have introduced thereinto hydrogen through a conduit 29. The light hydrocarbon liquids are removed from the process and are used as the extraction solvent in the later stages, as a gasoline component, and the like, in separate processes.

The bottom effluent from the high pressure separator is conducted through a conduit 22 to a solvent extraction zone 24. An extraction solvent is introduced into the solvent extraction zone through a conduit 44. A suitable extraction solvent is, e.g., benzene or alkylated derivatives thereof, or any mixtures thereof. In the solvent extraction zone, operated at relatively high temperature and pressure conditions, optionally at supercritical temperature and pressure conditions for a specific solvent, the heavy organic coal constitutents rich in hydrogen are dissolved in the extraction solvent, while ash and undissolved coal is rejected from the bottom of the solvent extraction zone through a conduit 26. The ash and undissolved coal can be used as a boiler fuel or to generate hydrogen in processes well known to those skilled in the art.

The extract phase is now removed from the top of the solvent extraction zone and subjected to pressure reduction in a pressure reducer 28, and to temperature reduction in a cooler 30, e.g., a shell and tube heat exchanger, whereby the pressure of the extract phase is reduced to about 500 psig and and the temperature to about 400° F. The extract phase is then conducted to a liquid fractionator 32, wherein separation of a solid fraction (deashed coal) from a liquid and gas fraction is now possible because of the decrease in the solubility power of the extraction solvent due to the decreased temperature and pressure conditions thereof. The deashed coal, withdrawn from the bottom of the fractionator, is a substantially aromatic hydrogen-rich normally solid coal extract which can be used as a product of the process or further refined for production of valuable liquid hydrocarbons. The liquid fraction is withdrawn from the liquid fractionator through a top conduit 36 and, insofar as it substantially comprises the extraction solvent and minute amounts of undissolved coal, it is combined with the extraction solvent in the conduit 44.

A portion of the liquid fraction (at least 20% by volume) is conducted to a pressure reducer 38, wherein its pressure is reduced to 20 psig, and, thereafter, to an atmospheric distillation column or stripper 40. In the stripper 40 that portion of the liquid fraction is separated into an overhead stream 42, which is substantially the extraction solvent, and a bottom product 46 which is high quality, highly aromatic coal extract.

A portion of this high quality coal extract is recycled back to the mixer as the liquefaction solvent through the conduits 48 and 6. The remainder of the high quality coal extract, produced in excess of the requirements of the liquefaction stage in the dissolution zone 12, is removed from the process through a coduit 46. This is the major product of the process which can be marketed as solvent refined coal or upgraded further to premium liquid products.

It will be apparent to those skilled in the art that the above described preferred embodiments and general description of the process can be successfully repeated with ingredients equivelent to those generically or specifically set forth above and under equivalent process conditions.

From the foregoing specification, one skilled in the art can readily ascertain the essential features of this invention and without departing from the spirit and scope thereof can adapt it to various equivalent applications.

What is claimed is:

1. An improved coal liquefaction process comprising the steps of (1) dissolving and liquefying the coal material in a dissolution stage and a liquefaction stage under dissolution and liquefaction conditions in the presence of a process-derived liquefaction solvent, (2) passing the liquefied coal to an extraction phase wherein dissolved heavy coal constituents rich in hydrogen are extracted with an extraction solvent, and wherein ash and undissolved coal constituents are removed, and (3) distilling, the improvement which comprises (1) recovery of coal liquid by means of extraction with solvent at supercritical temperature and pressure for that solvent, (2) separation of the coal liquid from the extract phase by decreasing temperature and pressure of the system without subjecting it to vacuum distillation and recovery of the said coal liquid as the ovehead product and (3) fractionation of the coal liquid into solvent refined coal and high quality liquids.

2. The process of claim 1 wherein the extraction solvent comprises light aromatics boiling between about 150° f. and 400° F.

3. The process of claim 1 wherein the liquefaction solvent is process-derived and is substantially soluble in light aromatic hydrocarbons having boiling points of below 400° F.

4. The process of claim 1 wherein the liquefaction solvent is introduced into the process at about 300° F. to about 700° F. and about 0 psig to about 4,000 psig.

5. The process of claim 4 wherein the amount of liquifaction solvent is such that the weight ratio of pulverized coal thereto is about 0.1 to about 5.0.

6. the process of claim 1 wherein the residence time of the extraction solvent and the bottom effluent from the high pressure separator in the solvent extraction zone is from about 1 to 100 minutes.

7. The process of claim 1 wherein in step (2) the pressure is about 100 psig and the temperature is about 10° F. below critical conditions of the solvent.

* * * * *

UNITED STATES PATENT AND TRADEMARK OFFICE
CERTIFICATE OF CORRECTION

PATENT NO. : 4,402,821

DATED : September 6, 1983

INVENTOR(S) : Tsoung-Yuan Yan

It is certified that error appears in the above—identified patent and that said Letters Patent is hereby corrected as shown below:

Column 6, line 26, "f' should be --F--.

Column 6, line 53, "271" should be --27--.

Signed and Sealed this

Sixth Day of March 1984

[SEAL]

Attest:

Attesting Officer

GERALD J. MOSSINGHOFF

Commissioner of Patents and Trademarks